July 15, 1930.  C. W. SHERMAN ET AL  1,770,674
SHOCK ABSORBER
Filed May 27, 1926    4 Sheets-Sheet 2
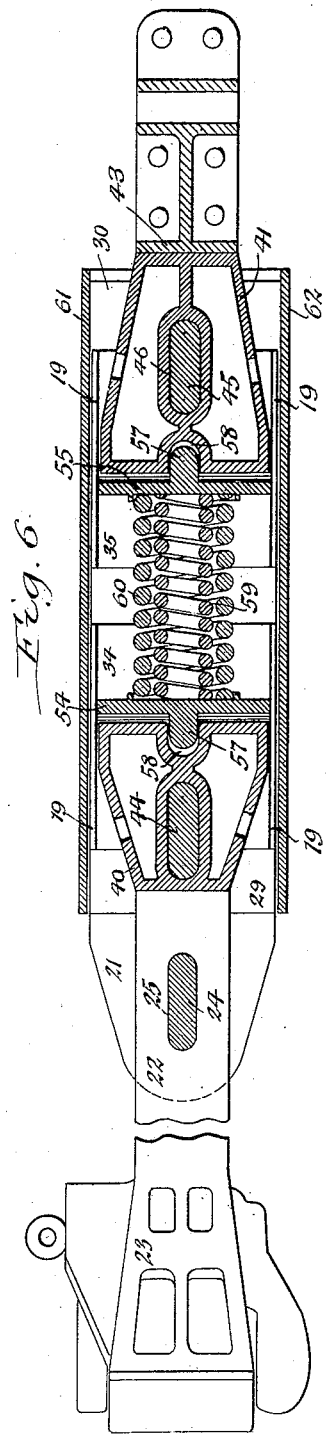
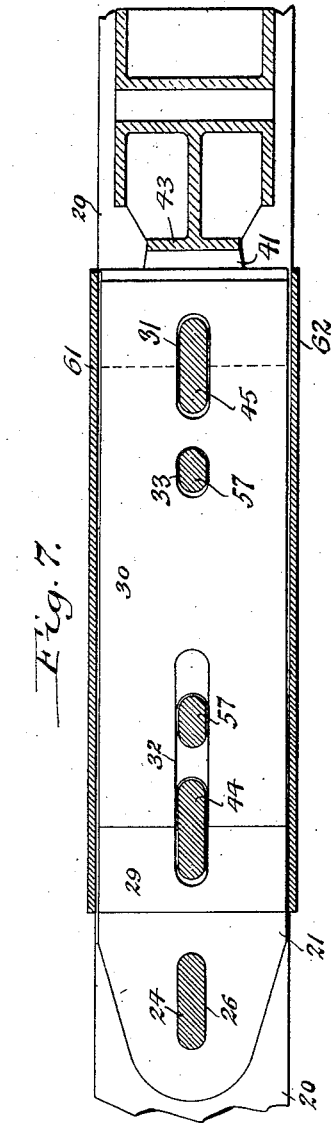
Inventor
Clifton W. Sherman
Joseph M. Hall
By Potth & Powers
Attorneys

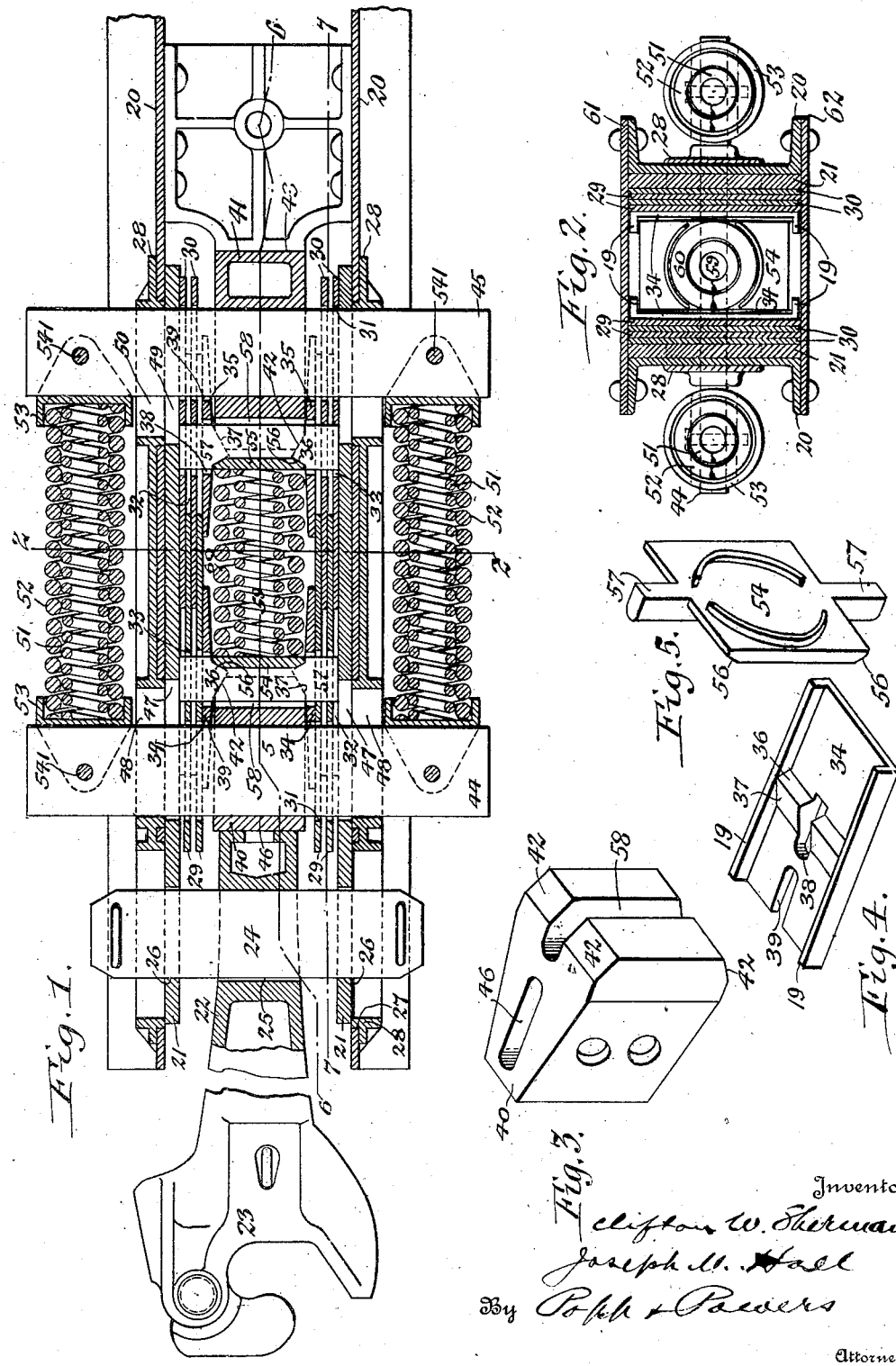

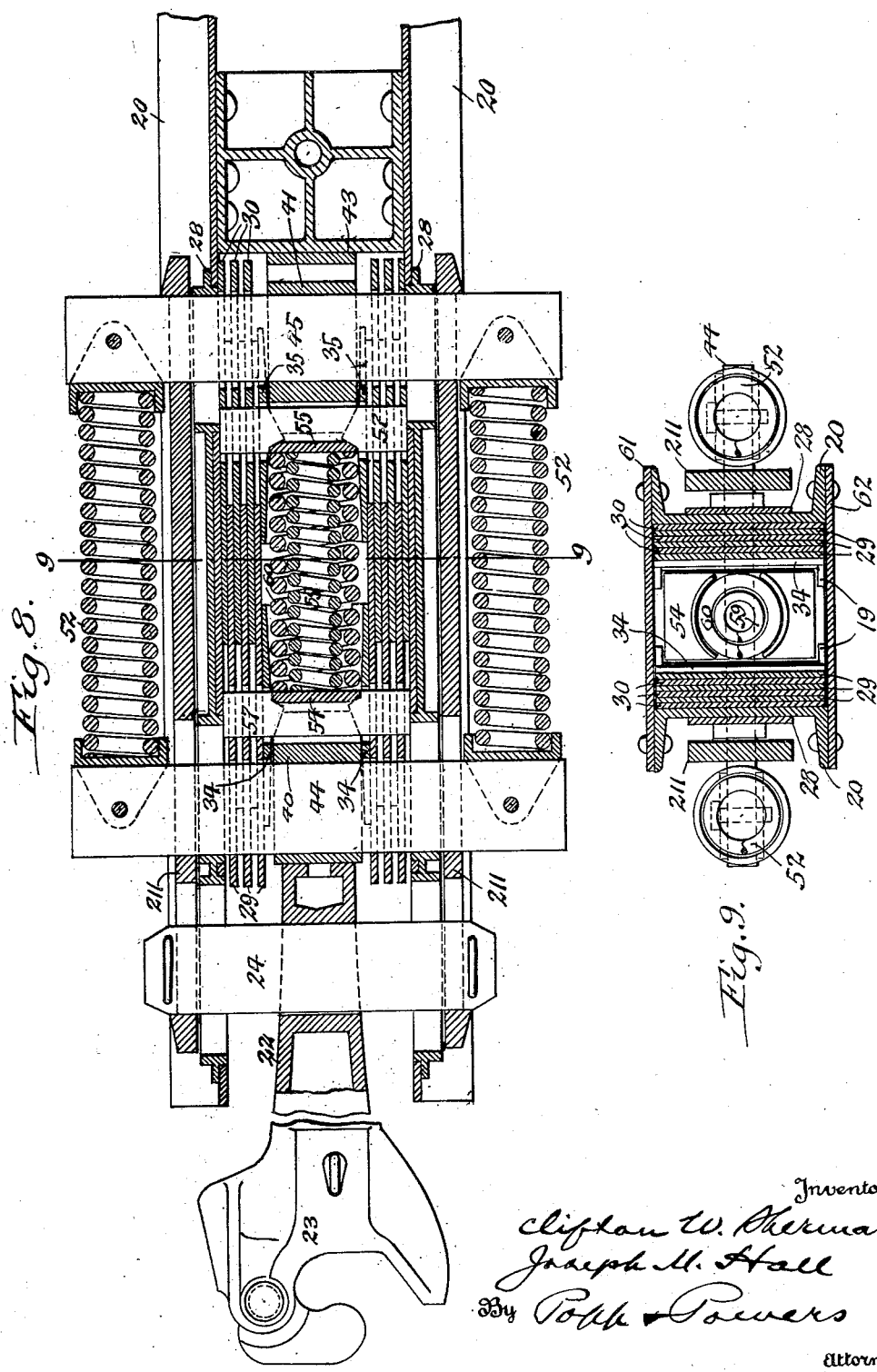

July 15, 1930. C. W. SHERMAN ET AL 1,770,674
SHOCK ABSORBER
Filed May 27, 1926   4 Sheets-Sheet 4
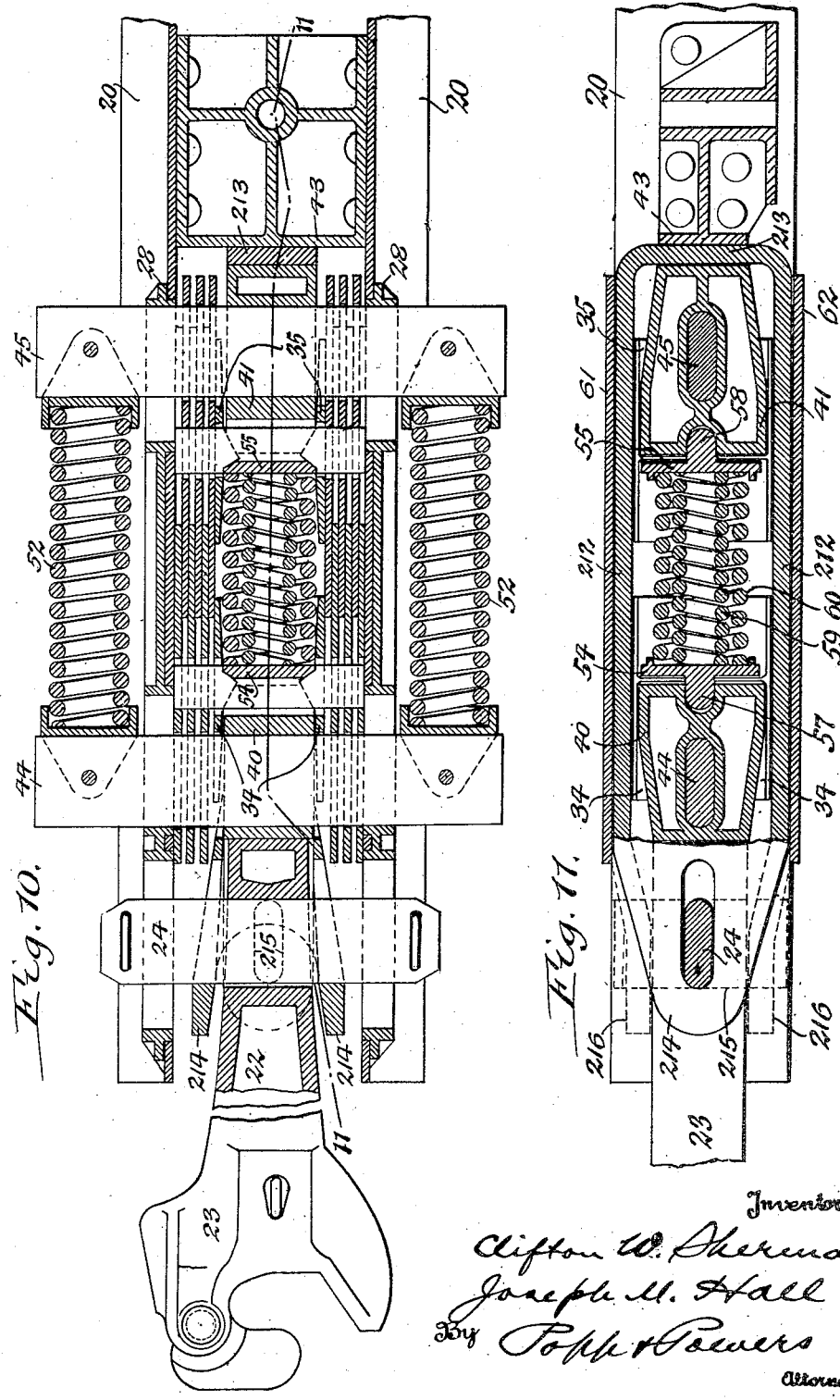

Patented July 15, 1930

1,770,674

UNITED STATES PATENT OFFICE

CLIFTON W. SHERMAN AND JOSEPH M. HALL, OF HAMILTON, ONTARIO, CANADA, ASSIGNORS TO HALL DRAFT GEAR CORPORATION, OF BUFFALO, NEW YORK, A CORPORATION OF NEW YORK

SHOCK ABSORBER

Application filed May 27, 1926. Serial No. 111,979.

This invention relates to a shock absorber which is more particularly intended for use in draft gears or riggings of railway cars and similar installations, when heavy shocks are to be cushioned and which is of the type employing a plurality of intercalated friction plates in addition to a spring resistance.

One of the objects of this invention is to materially increase the frictional area and also increase somewhat, the spring resistance and thus permit of increasing the shock absorbing capacity of the gear and still reduce the work done by the friction plates per square of surface, by distributing the same over a greater area.

Another object of this invention is to dispense with castings, housings or the like around the spring system and friction plates and instead utilize car sills or beams as the lateral abutments for the means whereby the friction plates are forced tightly against one another for absorbing shock.

A further object of this invention is to so organize the above mechanism that the same will come within the standard dimensions of car construction now in general use and thus permit of ready installation of this absorber at low cost and without rebuilding the car or interfering with standard equipment.

In the accompanying drawings:

Figure 1 is a horizontal section of a shock absorber embodying one form of our invention.

Figure 2 is a cross-section of the same taken on line 2—2 Fig. 1.

Figures 3, 4 and 5 are perspective views of a wedge block, a wedge shoe, and a combined spring seat and release bar forming part of this invention.

Figures 6 and 7 are vertical longitudinal sections taken on the correspondingly numbered lines in Fig. 1.

Figure 8 is a horizontal section of a slightly modified form of our improved shock absorber.

Figure 9 is a cross-section of the same taken on line 9—9, Fig. 8.

Figure 10 is a horizontal section, showing another modification of our invention.

Figure 11 is a vertical longitudinal section taken on line 11—11, Fig. 10.

Similar characters of reference indicate like parts in the several figures of the drawings:

Referring to the structure shown in Figs. 1–7, the numerals 20, 20 represent the longitudinal sills or beams which are part of the main frame of the car, and which in the present instance are constructed in the form of channel irons having their channels facing laterally outward. Arranged lengthwise on the inner sides of the sills and adapted to engage frictionally therewith are the two longitudinal straps, bars or plates 21, 21 which form parts of the draft yoke and are coupled with the shank or butt 22 of the coupler 23 which is arranged between the coupler 23 which is arranged between the front parts of the straps by a front coupler key 24 passing transversely through an opening 25 in the rear end of the butt, and also through openings 26 in the front ends of the yoke straps, as shown in Figs. 1, 6 and 7. The opposite ends of the front key 24 also pass through longitudinal slots 27, in the adjacent part of the car sills. The edges of these slots are lined by cheek plates or castings 28, secured to the outer sides of the sills for the purpose of reinforcing the same, thereby forming a support, and longitudinal guides for the coupler 23 and the front ends of the draft yoke straps 21.

Adjacent to the inner side of each yoke strap are arranged two sets of intercalated friction plates 29, 30, each of which has an outer longitudinal slot 31 at its outer end and an inner longitudinal slot 32 at its inner end and an intermediate longitudinal slot 33 adjacent to its outer end. At the front and rear ends of the several sets of friction plates, the same are engaged on their inner sides by front and rear wedge shoes 34, 35, each of which is provided at its longitudinal edges with longitudinal reinforcing flanges 19. Midway of the inner side of each wedge shoe the same is provided with a transverse rib, having an inwardly facing incline 36 and an outwardly facing incline 37, and on its central part the same is provided with a central longitudinal slot 38 and at its outer end with an outer slot 39.

The numerals 40, 41 represent front and rear wedge blocks which are arranged respectively between the front and rear pairs of wedge shoes and each of which is provided at its inner end with inwardly converging inclines or faces 42 which engage respectively with the outwardly diverging inclined faces 37 of the adjacent pair of wedge shoes. The front wedge block in the relaxed condition of the gears, engages its outer end with the rear end of the coupler butt and the outer end of the rear wedge block engages a stop block 43, secured to the opposing inner parts of the car sills. Each of the wedge blocks has its horizontally opposite sides arranged between the inwardly projecting flanges 19 of the adjacent wedge shoes, as shown in Figs. 1, 2 and 3, thereby guiding these parts relatively to each other.

The numerals 44, 45 represent front and rear thrust keys or bars, the front one passing transversely through a slot 46 in the front wedge blocks and the slots 39, 31, 32 of the adjacent wedge shoes, and friction plates and also through intermediate longitudinal slots 47 in the yoke straps and intermediate slots 48 in the car sills, which latter are also lined and reinforced by the cheek plates 28. The rear thrust key passes through a slot 46 in the rear wedge block and through the outer slots 39 of the adjacent wedge shoes and the slots 31, 32 of the friction plates, and also through rear longitudinal slots 49 in the yoke straps and rear longitudinal slots 50 in the car sills, which latter are also lined and reinforced by the cheek plates, as shown in Fig. 1.

Adjacent to the outer sides of the car sills are the members of the releasing spring system which in its preferred form consists of two longitudinal clusters comprising an inner spring 51 and an outer spring 52 surrounding the inner spring, and both springs bearing at opposite ends against cup-shaped heads or sockets 53 which are connected by vertical pins 541 to the adjacent outer ends of the front and rear thrust keys.

Adjacent to the inner ends of the front and rear wedge blocks are front and rear spring seat 54, 55 each of which is provided at its transversely opposite edges with outwardly converging inclines or wedge faces 56, which engage with the inwardly diverging inclines 36, 36, on the adjacent pair of wedge shoes, as shown in Fig. 1. On its outer side each spring seat is provided with a transverse releasing bar 57 preferably formed integrally therewith and engaging its central part with a notch 58 in the inner end of the adjacent wedge block and projecting with its opposite ends through the central slots 38 of the adjacent wedge shoes and the adjacent slots 32, 33 of the friction plates.

Interposed between the two spring seats and arranged centrally between the two pairs of friction plates and wedge shoes, is a main thrust spring system which resists movement of the wedge blocks and associated parts, one lengthwise relatively to another which thrust spring system preferably consists of an inner spring 59 and an outer spring 60 surrounding the inner spring and both springs bearing against the inner side of the central spring seats, as shown in Figs. 1 and 6.

Those parts of the car sills upon which the shock absorber is mounted are connected at the top or upper side by a top retaining plate 61 and at the bottom or underside by a bottom retaining plate 62, which plates may be riveted to the flanges of the sills as shown in Fig. 2, or secured by any other suitable means. The plates hold the sills against spreading under the stress of the block absorber when the same is subjected to a load and retain the parts in their proper relative position.

The operation of this shock absorber is as follows:—

When the shock absorber is in its fully relaxed or released position, the springs forming the spring resistance are under an initial compression which is effected prior to completing assembling of the parts, and when thus fully relaxed, the front and rear friction plates, wedge shoes, wedge blocks and thrust keys are drawn apart their fullest extent, the front thrust keys engage with the front ends of the sill slots 48, the rear thrust keys engage with the rear ends of the rear sill slots 50, the rear wedge block bears against the rear stop, and the outer sides of the releasing bars engage with the outer ends of the outer slots 31 in the friction plates, as shown in Figs. 1, 6, 7.

If a buffing force is applied to the coupler sufficient to overcome the initial resistance of the draft gear caused by the initial compression of the springs, and the frictional resistance set up between the several friction plates by the wedge actions of the blocks, shoes and spring seats; the front thrust keys and front wedge block move inwardly and the wedge shoes are caused to slide on the friction plates at both ends of the draft gear independently of the friction plates until the front thrust key engages with the inner ends of the outer slots 31, in the front sets of friction plates, thereby causing the several intercalated sets of friction plates to be more tightly pressed together transversely of their length by the cooperating inclines of the wedge blocks, wedge shoes and central spring seats. The instant the front thrust key engages the inner ends of the slots 31 in the front sets of friction plates, the latter begin to move rearwardly and by frictional engagement with the rear sets of friction plates, the latter are also moved rearwardly until the inner ends of the outer slots in the rear sets of friction plates engage with the inner edge of the rear thrust key. After this, the rear sets of friction plates are held stationary and the front sets of friction plates are caused to slide rearwardly on the rear sets of friction plates as the buffing load overcomes the progressively increasing frictional and spring resistance of the friction plates, and the springs of the main thrust and the releasing spring systems, thereby gradually checking the movement of the buffing load and absorbing the shock so as to avoid injurious actions on the car and its cargo, or discomfort to the passengers which are being carried.

When the buffing load on the shock absorber is relieved to such an extent as will allow the release springs to force the front thrust key forwardly, these springs first tend to relieve the wedging action on the wedge shoes. The pressure of the main thrust spring system, which is under compression, still forces the front spring seat against the front wedge shoes and tends to hold the latter in wedging engagement therewith until the outer edge of the front releasing bar is forced into contact with the outer ends of the outer slots 31 in the front sets of friction plates. The pressure of the main thrust spring is then divided between causing a wedging action on the wedge shoes and a retractive action on the friction plates at which time the releasing spring system also tends to force the front thrust key forwardly to relieve the wedge action of the wedge shoes.

When the front thrust key engages the outer ends of the intermediate sill slots 48, the outward or forward movement of the front sets of the friction plates is arrested. During this forward movement of the front sets of friction plates the rear sets move therewith until the outer ends of the outer slots 31 in the rear sets of friction plates engage the outer edge of the rear thrust key after which the rear sets of friction plates are held and the front sets move forwardly independently of the rear sets but still in sufficient frictional engagement therewith to prevent unduly quick or free release of the gear upon removal of the buffing load.

Upon subjecting the shock absorber to a pulling action the operation is substantially the same as that just described excepting that the front thrust key remains stationary and the rear thrust key and wedge block are moved forwardly with the coupler by means of the yoke straps which connect the rear thrust key with the coupler.

During a buffing action, the yoke straps slide on the rear thrust key and during a pulling action these straps slide on the front thrust key, but during both of these actions, the yoke straps are gripped frictionally between the inner sides of the car sills and the outer sides of the respective sets of friction plates, whereby these yoke straps, in effect, become a part of the friction system and aid in absorbing shock.

By these means the frictional resistance area of the absorber is materially increased, the work done per square inch of friction area is greatly reduced and the capacity of the absorber is also increased.

Moreover, by reducing the amount of work done per square inch of area, due to distributing over a greater area, the wear upon the plates is reduced and the cost of replacement lessened accordingly.

If desired, the yoke straps may be arranged outside of the car sills, as shown at 211 in Figs. 8 and 9, and the friction plates may engage directly with the inner sides of the car sills as shown in same figures, in which case these straps perform the same function as those shown in Figs. 1, 2, 6, 7 with the exception that they do not contribute any friction area to aid in the absorption of shock; and the description of the method of operation with reference to the structure shown in Figs. 1, 2, 6 and 7 therefore applies to that shown in Figs. 8 and 9.

Instead of connecting the coupler with the thrust keys, as shown in Figs. 1-9, for operating the shock absorber, substantially the same effect may be produced by employing a yoke which connects the coupler with the rear wedge block, and which as shown by full lines in Figs. 10 and 11, may consist of upper and lower longitudinal straps 212 extending over the upper and lower sides of the wedge blocks and the parts between the same, a rear vertical abutment bar 213 connecting the rear ends of the longitudinal straps and interposed between the rear wedge block and the rear stop, and two slotted coupling lugs 214 arranged at the front ends of the longitudinal straps and receiving opposite ends of the coupler key 24. Another way which would be suitable for connecting the upper and lower yoke straps 212 with the coupler consists of a vertical coupling pin 215 passing through the coupler butt and perforated lugs 216 arranged at the front ends of the straps 212, as shown by dotted lines in Figs. 10 and 11.

The practical operations of the structure shown in Figs. 10 and 11 are substantially like that described with reference to the structure shown in Figs. 1-9.

It will be noted that in this device the draft sills and cover plates connecting the same form, in effect, a friction casing; the straps or links 21 serve as draft members as well as friction members; and the wedge elements also serve as followers.

We claim as our invention:

1. A shock absorber comprising a casing consisting of longitudinal sills forming part of a car body and transverse plates connected with said sills; a plurality of sets of straight longitudinal, intercalated friction plates arranged within said casing and each set movable lengthwise relatively to the other; wedge means for pressing said friction plates laterally against said sills; a draft means for causing said wedge means to exert lateral outward pressure against said friction plates and sills, and a spring resistance which opposes the movement of said draft means against said wedge means.

2. A shock absorber comprising a casing consisting of longitudinal sills forming part of a car body and transverse plates connected with said sills; draft means including longitudinal yoke straps engaging with the inner sides of said sills; a plurality of sets of intercalated longitudinally movable straight friction plates arranged within the casing and between said yoke straps and each set movable lengthwise relative to the other; wedge means for pressing said friction plates laterally outward against said yoke straps and pressing said yoke straps laterally outward against said sills; draft means for shifting said yoke straps lengthwise and causing said wedge means to act; and spring means for resisting longitudinal movement of said wedge means under the action of said draft means.

3. A shock absorber comprising a casing having longitudinal sills provided with longitudinal slots and transverse plates connecting said sills; a plurality of sets of longitudinal intercalated straight friction plates arranged between said sills and co-acting therewith each set movable lengthwise relatively to the other and provided with longitudinal slots; wedge means for pressing said friction plates laterally outward toward said sills and including wedge shoes engaging with the inner longitudinal side of said sets of friction plates and wedge blocks having wedging engagement with said wedge shoes, a spring resistance opposing movement of said wedge means; transverse keys passing through said wedge blocks, friction plates and sill slots; draft means for shifting said wedge blocks, and friction plates lengthwise and spring means engaging the outer ends of said keys.

4. A shock absorber comprising a casing having longitudinal sills provided with longitudinal slots and transverse plates connecting said sills; a plurality of sets of longitudinal intercalated straight friction plates arranged between said sills and co-acting therewith each set movable lengthwise relatively to the other and provided with longitudinal slots; wedge means for pressing said friction plates laterally outward toward said sills and including wedge shoes engaging with the inner longitudinal side of said sets of friction plates and wedge blocks having wedging engagement with said wedge shoes; keys mounted on said wedge blocks and passing through said slots; a releasing spring means engaging the outer ends of said keys; and main spring means for moving said friction plates apart after compression.

5. A shock absorber comprising a casing consisting of longitudinal sills having longitudinal slots and transverse plates connecting said sills; a plurality of sets of intercalated longitudinal straight friction plates each set movable lengthwise relatively to the other end provided with inner and outer longitudinal slots; wedge means for pressing said friction plates laterally outward and including wedge shoes engaging with the inner sides of said sets of friction plates and longitudinally movable wedge blocks engaging with said wedge shoes; keys passing transversely through said wedge blocks, the outer slots in said friction plates and the slots in said sills; releasing springs interposed between the ends of said keys; return members engaging with the inner slots of said friction plates; and main spring means interposed between said return members.

6. A shock absorber comprising a casing having longitudinal sills provided with longitudinal slots and transverse plates connecting the sills; yoke straps engaging with the inner longitudinal sides of said sills and provided with longitudinal slots; a plurality of sets of intercalated longitudinal straight friction plates engaging with the inner longitudinal sides of said yoke straps, each set movable lengthwise relative to the other and having inner and outer longitudinal slots; wedge means for pressing said friction plates laterally outward and having wedge shoes engaging with the inner side of said sets of friction plates and longitudinally movable wedge blocks engaging with said wedge shoes; thrust keys passing transversely through said wedge blocks, the outer slots of the friction plates and the slots in the sills; release spring means interposed between the ends of said keys; release bars passing through said wedge blocks, wedge shoes and the inner slots of said friction plates and having spring seats between said wedge shoes; and a main spring interposed between said spring seats.

7. A shock absorber comprising a casing having longitudinal sills provided with longitudinal slots and transverse plates connecting the sills; yoke straps engaging with the inner longitudinal sides of said sills and provided with longitudinal slots; a plurality of sets of intercalated longitudinal straight friction plates engaging with the inner longitudinal sides of said yoke straps, each set movable lengthwise relative to the other and having inner and outer longitudinal slots; wedge means for pressing said friction plates laterally outward and having wedge shoes engaging with the inner side of said sets of friction plates and longitudinally movable wedge blocks engaging with said wedge shoes; thrust keys passing transversely through said wedge blocks, the outer slots of the friction plates and the slots in the sills; release spring means interposed between the ends of said keys; release bars passing through said wedge blocks, wedge shoes and the inner slots of said friction plates and having spring seats between said wedge shoes; a main spring interposed between said spring seats, a coupler butt engaging one of said wedge blocks; and a key passing through said coupler butt and yoke straps and guided on said sills.

In testimony whereof we, hereby affix our signatures.

CLIFTON W. SHERMAN.
JOSEPH M. HALL.